March 2, 1971  F. T. GIBBINGS  3,567,286

WHEEL COVER

Filed Jan. 14, 1969

INVENTOR.
FREDERIC T. GIBBINGS

United States Patent Office 3,567,286
Patented Mar. 2, 1971

3,567,286
WHEEL COVER
Frederic T. Gibbings, Bloomfield Hills, Mich., assignor to North American Rockwell Corporation, Philadelphia, Pa.
Filed Jan. 14, 1969, Ser. No. 791,004
Int. Cl. B60b 7/02
U.S. Cl. 301—37                                   4 Claims

ABSTRACT OF THE DISCLOSURE

An automotive wheel cover having spring fingers projecting generally axially from a continuous generally cylindrical flange, with outwardly bent terminal portions on the fingers terminating in scalloped edges formed by arcuate indentations intersecting in sharp spurs adapted to bite into a generally cylindrical flange on the wheel rim and resist both withdrawal and turning of the wheel cover relative to the rim.

---

This invention relates to automotive wheels covers having a novel construction of spring retaining fingers which engage the wheel rim to resist both accidental removal of the wheel cover and rotation of the wheel cover relative to the wheel.

As is well known to those familiar with the art, the retention of a wheel cover on an automotive wheel involves substantial problems due to the shocks and strains which are encountered in normal driving and which tend to dislodge the wheel cover from the wheel. It is obvious, for example, that when the wheel strikes an obstruction in the road, or passes over a curbing or a hole in the road, the abrupt deceleration of the wheel and the inertia of the wheel cover tend to cause the latter to separate from the wheel. Less apparent is the fact that even in straight-line driving along a smooth road, a portion of the weight of the automobile is imposed against the bottom of each wheel, causing a slight flattening of that side of the wheel, imperceptible to the eye but of significant magnitude, and as the wheel rotates, the position of this flattened portion is continually moving around the circumference of the wheel. This flattening effect is aggravated when the wheel strikes an obstruction or even when the car turns a corner, so that the weight is concentrated on the two outside wheels. Even more significantly, the transverse forces imposed on the tread of the tire due to the inertia and the centrifugal force of the car as it turns are transmitted through the tire to the rim of the wheel, twisting the wheel out of planar alignment. The wheel is subjected to still other complex stresses when the brakes are applied, and so on.

Providing a wheel cover having retention means capable of holding the wheel cover on the wheel against such shocks and distortion of the wheel obviously involves substantial problems.

Moreover, it is very important that the retention means not only prevent accidental outward movement of the wheel cover but also prevent rotation of the wheel cover relative to the wheel, not merely to prevent twisting or breakage of the valve stem or valve stem extension which projects through a hole in the wheel cover, but also because relative rotation of the wheel cover will almost inevitably cause the wheel cover gradually to work its way off of the wheel.

The present invention is an improvement of the general type of wheel cover retention means disclosed and claimed in U.S. Pat. No. 2,624,634 issued Jan. 6, 1953 to George Albert Lyon, referred to hereinafter as the "Lyon finger." The Lyon finger has enjoyed extensive commercial use because it provides excellent retention of the wheel cover against all of the aforementioned stresses and strains which tend to dislodge the wheel cover from the wheel, and yet is susceptible of economical fabrication, for example being adaptable to a one-piece construction in which the entire wheel cover, including the decorative portion and the retaining means, are stamped and die formed from a single sheet of metal, preferably stainless steel.

The present invention provides a wheel cover having all of these advantages of the Lyon finger plus substantially improved resistance to rotation of the wheel cover relative to the wheel.

Figure 1:
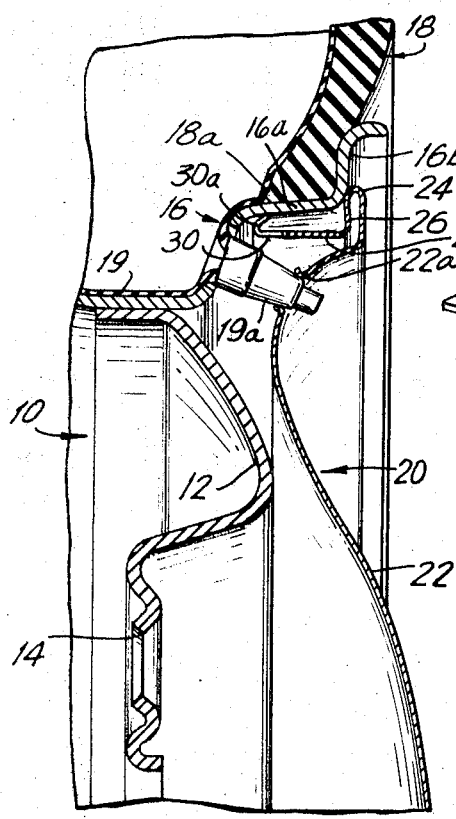
FIG. 1 is a fragmentary cross-sectional view through an automobile wheel on which is mounted a wheel cover representing an illustrative embodiment of certain features of the present invention.

FIG. 1 shows the upper portion of a typical automobile wheel 10 formed of a circular body portion or web 12 with mounting holes 14 for engagement with the lug bolts projecting from the mounting plate on the brake drum. Welded to the periphery of the body portion 12 is a multi-flanged dropcenter rim 16 on which the tire 18 is mounted, with its bead 18a seated against a generally cylindrical flange 16a of the rim, and with its outer margin in sealing abutment with a generally radially extending annular surface 16b of the rim adjoining the outer edge of the flange 16a.

The wheel cover, generally designated 20, includes a central, circular decorative portion 22, which may be shaped, finished and ornamented in any of an almost infinite variety of designs. For purposes of illustration, the tire 18 is shown with an inner tube 19, the valve stem 19a of which projects through an opening 22a in the decorative surface 22 of the wheel cover.

At its outer periphery, the wheel cover 20 is provided with a turned edge 24, the rear portion of which is adjoined by a generally radially extending annular skirt 26 adapted to abut the annular surface 16b of the rim 16. The inner edge of the skirt 26 adjoins a generally axially and rearwardly extending, generally cylindrical flange 28 which extends without interruption around the periphery of the wheel cover. Projecting from the rear edge of the flange 28 are a plurality of spring retaining fingers 30 having relatively short and stiff terminal portions 30a bent generally radially outwardly and slightly forwardly, with the outer edges of the terminal portions 30a of all of the fingers 30 lying substantially along a common circle 32 (FIG. 2 and 4) of such diameter that as the wheel cover 20 is pressed onto the wheel 10, the terminal portions 30a will engage the curved juncture between the annular surface 16b and the flange 16a of the rim 16, camming the fingers radially inwardly against their spring resistance, which is reinforced by the continuous cylindrical flange 28, with the resilience of this spring system serving to press the edges of the terminal portions 30a tightly against the flange 16a of the rim.

Figure 3:
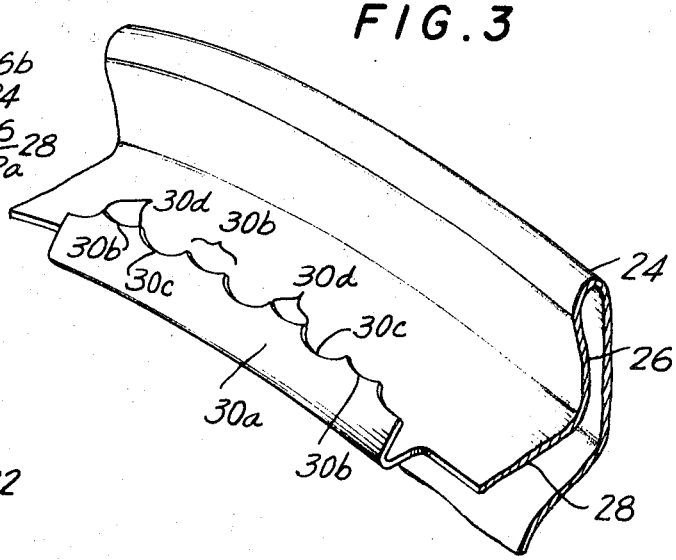
FIG. 3 is an enlarged perspective view of a selected area of the marginal portion shown in FIG. 2.
Figure 2:
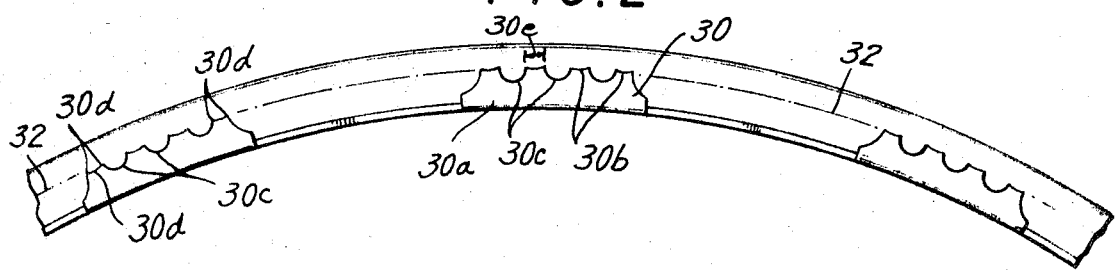
FIG. 2 is a fragmentary elevational view of a section of the marginal portion of the wheel cover of FIG. 1.
Figure 4:
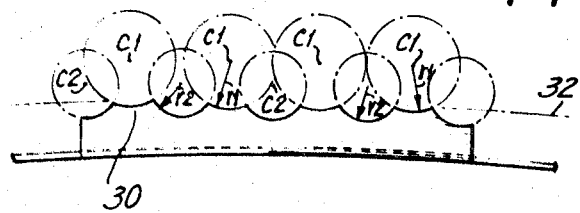
FIG. 4 is a diagrammatic view, at the approximate scale of FIG. 3, showing the profile of the terminal portion of one of the retaining fingers, with the radii of curvature of the several segments thereof indicated in broken lines.

As shown in FIGS. 2, 3 and 4, the outer edges of the terminal portions 30a of the fingers 30 are provided with a series of arcuate indentations 30b and 30c intersecting one another to form sharp projecting cusps or spurs 30d which lie substantialy along the common circle 32. These spurs 30d bite into the surface of the flange 16a of the rim and considerably enhance the frictional engagement between the wheel cover and the wheel.

Preferably, as best shown in FIG. 4, the alternating arcuate indentations 30b and 30c are of different radii of curvature, $r_1$ and $r_2$, respectively, with the larger radii $r_1$ centered at the points $c_1$ and the smaller radii $r_2$ centered at the points $c_2$ spaced inwardly therefrom. Thus, the terminal portion 30a is divided into separate tooth portions 30e, each having a projecting cusp or spur 30d at each side. This allows the several teeth portions 30e to flex to some extent independently of one another, so that the tooth portions may conform to the curvature of the flange 16a of the rim, and even to slight variations of the surface of the flange from perfect circular cross-sectional shape.

In the particular illustrative wheel cover shown, each finger 30 has four of such bicuspid teeth, and there are three fingers in each group (one of such groups being shown in FIG. 2), with a total of four such groups spaced equally around the circumference of the wheel cover. This arrangement is of course, merely illustrative and may be varied to suit differing requirements.

The type of retaining fingers illustrated have been found to give the wheel cover excellent capability of resisting the shocks and strains to which the wheel is subjected during driving, including the forces which distort the wheel out of its normal circular and planar shape and thus tend to "pop" the wheel cover off of the wheel.

For example, in a standard drop test (in which a wheel having mounted thereon a tire inflated to a pressure of 40 p.s.i. is dropped from a height of six feet), a one-piece wheel cover made of .020" gauge type 301 stainless steel with a nominal 14" diameter, having retaining means of the type shown and described, was retained in proper, fully seated position on the wheel even when the wheel cover had 8.75 pounds of steel washers attached by a bolt to the center of the decorative surface.

The wheel cover also has been found to exhibit a surprising degree of resistance to rotation relative to the wheel.

In a standard torque test, a torque of 200 to 210 foot pounds was required to cause rotation of the wheel cover relative to the wheel.

These test results represent retention performance substantially exceeding all known specifictions of automobile manufacturers, and either exceed or compare favorably with the typical performance of even the most expensive multi-piece wheel cover constructions in regular commercial use heretofore (having separate spring members of hardened steel secured to a flange of the wheel cover, for example by riveting).

As disclosed more fully in the aforementioned Lyon U.S. Pat. No. 2,624,634, a type 301 nickel-chromium stainless steel sheet material with primarily austenitic character is hardened by localized cold drawing and working in the areas of the fingers 30, so that these areas acquire a martensitic character with a tensile strength in the range of 100,000 to 125,000 p.s.i. This gives the fingers the desired stiffness and spring characteristic without resorting to the expensive alternative of separate spring members, which involves numerous additional operations (including many manual operations) to position and secure them on the wheel cover.

The arcuate shape of the indentations in the outer edge of the terminal portions of the fingers avoids stress concentrations which tend to initiate tearing or fracture of the metal, either during stamping or die forming operations, or during installation or use.

It will thus be appreciated that the present invention accomplishes the aforementioned and other apparent desirable objectives. However, it should be emphasized that the particular embodiment of the invention shown and described is intended as merely ilustrative of the principles of the invention and not as exhaustive or limiting thereof. It will be readily apparent to those familiar with the art that this illustrative embodiment may be altered to meet different requirements without departing from the spirit of the invention. As merely one example, while there in shown a one-piece construction in which the spring fingers 30, the flange 28 and the skirt 26 are formed from the same piece of metal as the decorative center portion 22, it will be apparent that all of the former portions could be formed of a separate unitary rolled ring which is secured to the decorative portion adjacent its peripheral edge, for example by folding and crimping the turned portion 24 against the outer margin of such ring, as disclosed in U.S. Pat. No. 2,624,639 issued to George Albert Lyon on Jan. 6, 1953.

I claim:

1. In a circular wheel cover for engagement with a multi-flanged drop-center automotive wheel rim, a peripheral turned edge, an annular marginal portion extending generally radially inwardly from said edge in position to abut a generally radially extending annular surface of said rim, a continuous circular flange extending axially rearwardly from said marginal portion, the rearward edge of said flange being formed to provide a plurality of spring retaining finger portions projecting generally axially rearwardly therefrom, the end of each of said finger portions being bent generally radially outwardly and forwardly to form a short, stiff terminal portion, the outer edge of said terminal portion being provided with a plurality of generally arcuate indentations intersecting one another to form a plurality of spaced, sharp, projecting spurs lying substantially along a common circle of such diameter that when said wheel cover is pressed rearwardly onto said rim to cause said marginal portion to abut said annular surface of said rim, said edges will engage an adjacent generally axially extending generally cylindrical flange on said rim, camming said finger portions resiliently inwardly, with said spurs biting into said flange to resist removal of said wheel cover from said rim and rotation of said wheel cover relative to said rim, said arcuate indentations having centers of curvature that are staggered so that said indentations are of alternating depth to form a plurality of bicuspid teeth separated by deeper arcuate cutouts.

2. A wheel cover as described in claim 1 in which said wheel cover is stamped and die formed entirely of a single piece of sheet metal wherein said fingers are generally harder than the central portion of said wheel cover due to cold drawing and working of said fingers during stamping and die forming.

3. In a circular wheel cover for engagement with a multi-flanged drop-center automotive wheel rim, a peripheral turned edge, an annular marginal portion extending generally radially inwardly from said edge in position to abut a generally radially extending annular surface of said rim, a continuous circular flange extending axially rearwardly from said marginal portion, the rearward edge of said flange being formed to provide a plurality of spring retaining finger portions projecting generally axially rearwardly therefrom, the end of each of said finger portions being bent generally radially outwardly and forwardly to form a short, stiff terminal portion, the outer edge of said terminal portion being provided with a plurality of arcuate indentations, each of said indentations having a constant radius of curvature, said indentations intersecting one another to form a plurality of spaced, sharp, projecting spurs lying substantially along a common circle of such diameter that when said wheel cover is pressed rearwardly onto said rim to cause said marginal portion to abut said annular surface of said rim, said edges will engage an adjacent generally axially extending generally cylindrical flange on said rim, camming said finger portions resiliently inwardly, with said spurs biting into said flange to resist removal of said wheel cover from said rim and rotation of said wheel cover relative to said rim.

4. A wheel cover as described in claim 3 wherein the centers of curvature of said indentations are staggered so that said indentations are of alternating depth to form a plurality of bicuspid teeth separated by deeper arcuate cutouts.

References Cited

UNITED STATES PATENTS

| | | | |
|---|---|---|---|
| 1,948,273 | 2/1934 | Lyon | 301—37 |
| 2,624,634 | 1/1953 | Lyon | 301—37 |
| 2,996,336 | 8/1961 | Wood | 301—37 |
| 3,043,632 | 7/1962 | Wagner | 301—37 |
| 3,305,275 | 2/1967 | Spisak | 301—37 |

RICHARD J. JOHNSON, Primary Examiner